United States Patent [19]
Baker et al.

[11] Patent Number: 5,348,366
[45] Date of Patent: Sep. 20, 1994

[54] DRAG REDUCING DEVICE FOR LAND VEHICLES

[76] Inventors: Myles L. Baker, 20084 Rimrock Rd. E., Apple Valley, Calif. 92307; David J. Levitt, 867 Arcturus Cir., Foster City, Calif. 94404

[21] Appl. No.: 111,659

[22] Filed: Aug. 25, 1993

[51] Int. Cl.$^5$ .............................................. B60R 27/00
[52] U.S. Cl. ............................ 296/180.4; 296/180.5
[58] Field of Search ............... 296/180.1, 180.2, 180.3, 296/180.4, 180.5

[56] References Cited

U.S. PATENT DOCUMENTS

| | | | |
|---|---|---|---|
| 3,971,586 | 7/1976 | Saunders | 296/180.4 |
| 4,236,745 | 12/1980 | Davis | 296/1 S |
| 4,257,641 | 3/1981 | Keedy | 296/1 S |
| 4,320,920 | 3/1982 | Goudey | 296/180.4 |
| 4,508,380 | 4/1985 | Sankrithi | 296/1 S |
| 4,682,808 | 7/1987 | Bilanin | 296/180.4 |
| 4,741,569 | 5/1988 | Stuphen | 296/1 |
| 5,058,945 | 8/1991 | Elliot, Sr. et al. | 296/180.5 |

FOREIGN PATENT DOCUMENTS

| | | | |
|---|---|---|---|
| 1079772 | 6/1980 | Canada | 296/180.4 |
| 878639 | 11/1981 | U.S.S.R. | 296/180.4 |

OTHER PUBLICATIONS

Little, B. H., Jr.; and Whipkey, R. R.; "Locked Vortex Afterbodies," AIAA Paper #78-1179, Jul., 1978.
Mair, W. A., "The Effect of a Rear-Mounted Disc on the Drag of a Blunt-Based Body of Revolution," The Aeronautical Quarterly, vol. 16, pp. 350–360.
Mair, W. A., "Drag-Reducing Techniques for Axisymmetric Bluff Bodies," in *Aerodynamic Drag Mechanisms of Bluff Bodies and Road Vehicles*, Gino Sovran, Thomas Morel, and W. T. Mason, Jr., eds., Plenum Press, 1978, pp. 161–187.
Mason, W. T., Jr., and Beebe, P. S., "The Drag Related Flow Field Characteristics of Trucks and Buses," in *Aerodynamic Drag Mechanisms of Bluff Bodies and Road Vehicles*, Gino Sovran, Thomas Morel, and W. T. Mason, Jr., eds., Plenum Press, 1978, pp. 161–187.
Morel, T., "The Effect of Base Slant on the Flow Pattern and Drag of Three-Dimensional Bodies with Blunt Ends," in *Aerodynamic Drag Mechanisms of Bluff Bodies and Road Vehicles*, Gino Sovran, Thomas Morel, and W. T. Mason, Jr., eds., Plenum Press, 1978, pp. 161–187.
Roshko, A. and Koenig, K., "Interaction Effects on the Drag of Bluff Bodies in Tandem," in *Aerodynamic Drag Mechanisms of Bluff Bodies and Road Vehicles*, Gino Sovran, Thomas Morel, and W. T. Mason, Jr., eds., Plenum Press, 1978, pp. 161–187.

*Primary Examiner*—Johnny D. Cherry
*Assistant Examiner*—Gary C. Hoge

[57] ABSTRACT

A device for the reduction of aerodynamic drag on land vehicles and more specifically tractor-trailer trucks, Consisting of rectangular plates mounted to the afterend of said truck. The plates are mounted to the truck's structural frame by hinged truss assemblies, normal to the road and parallel to the truck body's rear end. The combined area of the plates is smaller than that of the truck's cross section. While the vehicle is moving, a vortex becomes locked between the plates and truck rear end creating a low pressure region. The suction created changes air flow patterns behind the vehicle such that base drag is reduced. The device is retractable and allows unobstructed loading.

6 Claims, 3 Drawing Sheets

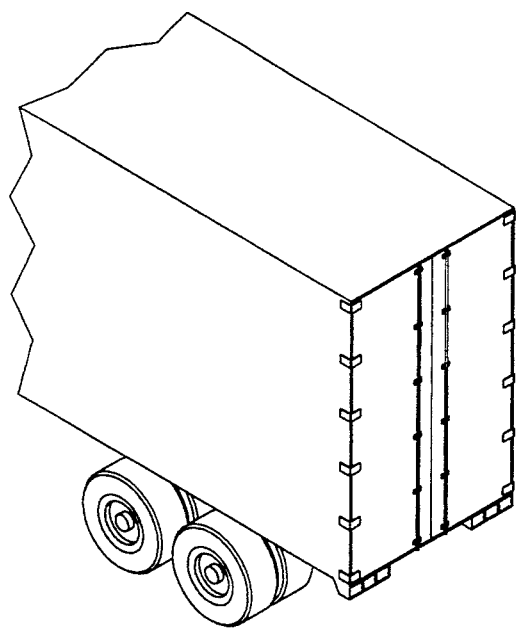
FIG. 1
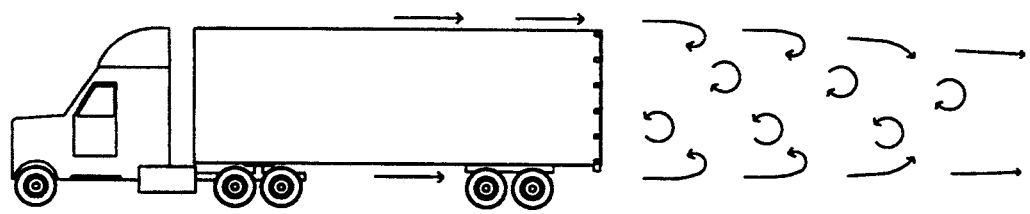
FIG. 2
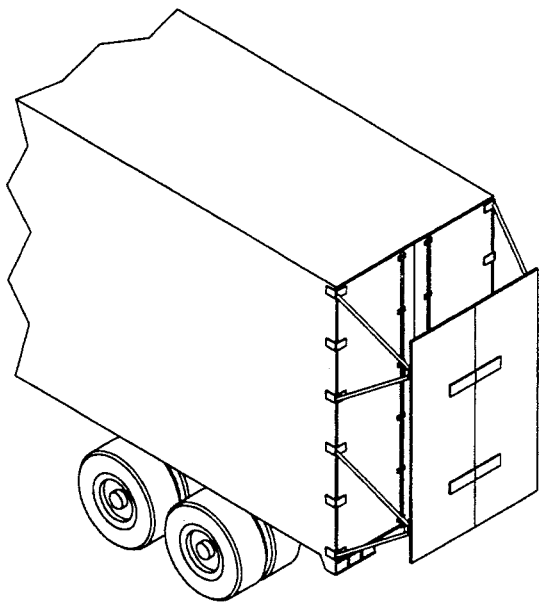
FIG. 3
FIG. 4
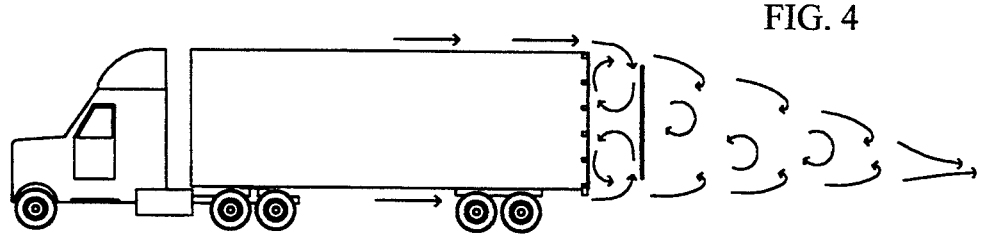

DRAG REDUCING DEVICE FOR LAND VEHICLES

FIELD OF INVENTION

This invention pertains to land vehicle drag reduction, and more specifically to the use of locked vortex afterbodies to reduce aerodynamic drag on trucks and trailers.

DISCUSSION OF PRIOR ART

The shape of conventional tractor-trailer rigs is dictated by a need to provide a large cargo volume within the maximum allowable dimensions fixed by stage laws. This constraint generally produces vehicles which sacrifice aerodynamics for cargo volume. A large pressure difference between the leading and trailing ends of the truck produces a retarding force as a result of this "boxy" shape shown in FIG. 1. Progress has been made in the use of aerodynamic fairings above the cab to successfully reduce pressure at the front of trucks. But the abrupt ending produces a large mass of circulating air (FIG. 2) and a low pressure region at the rear. This low pressure region applies a suction to the rear of the truck retarding its motion. The ideal solution to this problem would be the addition of a long tapered fairing or boat tail. Unfortunately, this is not a practical solution because this streamline extension would exceed the legal length and obstruct access to the rear doors.

There are a variety of devices in the prior art that are intended to replace a permanent fairing but none has proven useful enough to come into widespread use. They have taken the form of a removable, inflatable fairing as in U.S. Pat. Nos. 4,741,569 to Stutphen (1988) and 2,737,411 to Potter (1956); a deployable, rigid fairing as in U.S. Pat. Nos. 5,058,945 to Elliot (1991) and 4,257,641 to Keedy (1981); and finally as a deployable frame with a fabric skin as in the case of U.S. Pat. No. 4,236,745 to Davis (1980). All of these devices lack simplicity in their deployment methods. While in place, they are awkward to use that they interfere with normal loading, they increase the visible area to cross winds thus increasing the risk of accidents, and finally they do not solve the problem of maneuverability.

In addition to fairings other methods of reducing flow separation have been attempted. These include vanes to redirect airflow as in U.S. Pat. No. 2,146,297 to Huet (1937), and pumps to divert airflow through the vehicle body as in U.S. Pat. No. 2,037,942 to Stalker (1935) where air is expelled near the rear of the vehicle in order to delay flow separation. The "boxy" shape and abrupt ending of tractor-trailer rigs makes these methods only marginally effective. Too much flow separation and too much turbulent air is produced to be significantly affected by a vane or secondary airstream.

In U.S. Pat. No. 4,508,380 to Sankrithi (1985) a device is described which alters the external geometry of a truck by allowing its side walls to taper inward when not fully loaded. The obvious disadvantage is that this does not solve the aerodynamic problem of a loaded truck. In addition, this is not a device which can be added to existing truck trailers.

The effects of rear mounted plates on the drag of bluff bodies was first investigated in a limited form by Mair (1965). His experiments dealt only with the case of an axi-symmetric body and varying sized circular plates. Mair left unresolved the problem of drag increases with certain plate locations, and in failing to further investigate the phenomenon did not see practical applications. Little and Whipkey (1978) attempted to characterize more definitively the phenomenon of locked vortex afterbodies and further suggested its applicability to aircraft. Still, their work served only to confirm Mair's experiments and failed to identify a solution to the problem of drag increases.

OBJECTS AND SUMMARY OF THE INVENTION

It is an object of the present invention to provide a device which reduces the aerodynamic drag of the truck on which it is installed and deployed.

It is also an object to provide a novel replacement for streamlined fairings by exploiting the locked vortex afterbody phenomenon hence making use of less material, effects of which are decreased skin friction drag and decreased area visible to cross-winds.

It is also an object to provide a drag reducing device that is both effective in use and more easily retractable than current devices.

It is a further object to provide a drag reducing device which allows easy access to a truck's rear doors.

It is a further object to provide a device which can be easily adapted as an aftermarket product to retrofit trailers which have already been built and may be included as an option on new trailers.

It is a further object to provide a device for the end of truck trailers which not only reduces aerodynamic drag but provides a novel surface on which to place advertising.

These objects and advantages of the invention are achieved by the addition of a rigid, rectangular plate to the rear of a vehicle body. The plate, mounted vertically and normal to the axis of the body, traps a vortex between itself and the body. The space in which the vortex is formed becomes a low pressure region which acts on the air traveling over and along the sides of the body. The modified air flow produces less aerodynamic drag than the standard air flow around a truck body. In the preferred embodiment, the plate is divided into two halves which can be swung inwardly on hinges and lie in parallel abutment with the after-end of the body.

DRAWING FIGURES

FIG. 1 is a perspective view of a typical truck without the invention.

FIG. 2 is a side elevation of a typical truck showing the air flow pattern without the invention.

FIG. 3 is a perspective view of a typical truck similar to FIG. 1, but with the invention deployed.

FIG. 4 is a side elevation of a typical truck, similar to FIG. 2 but with the invention deployed, illustrating the improved air flow pattern.

DESCRIPTION

Figure 5:
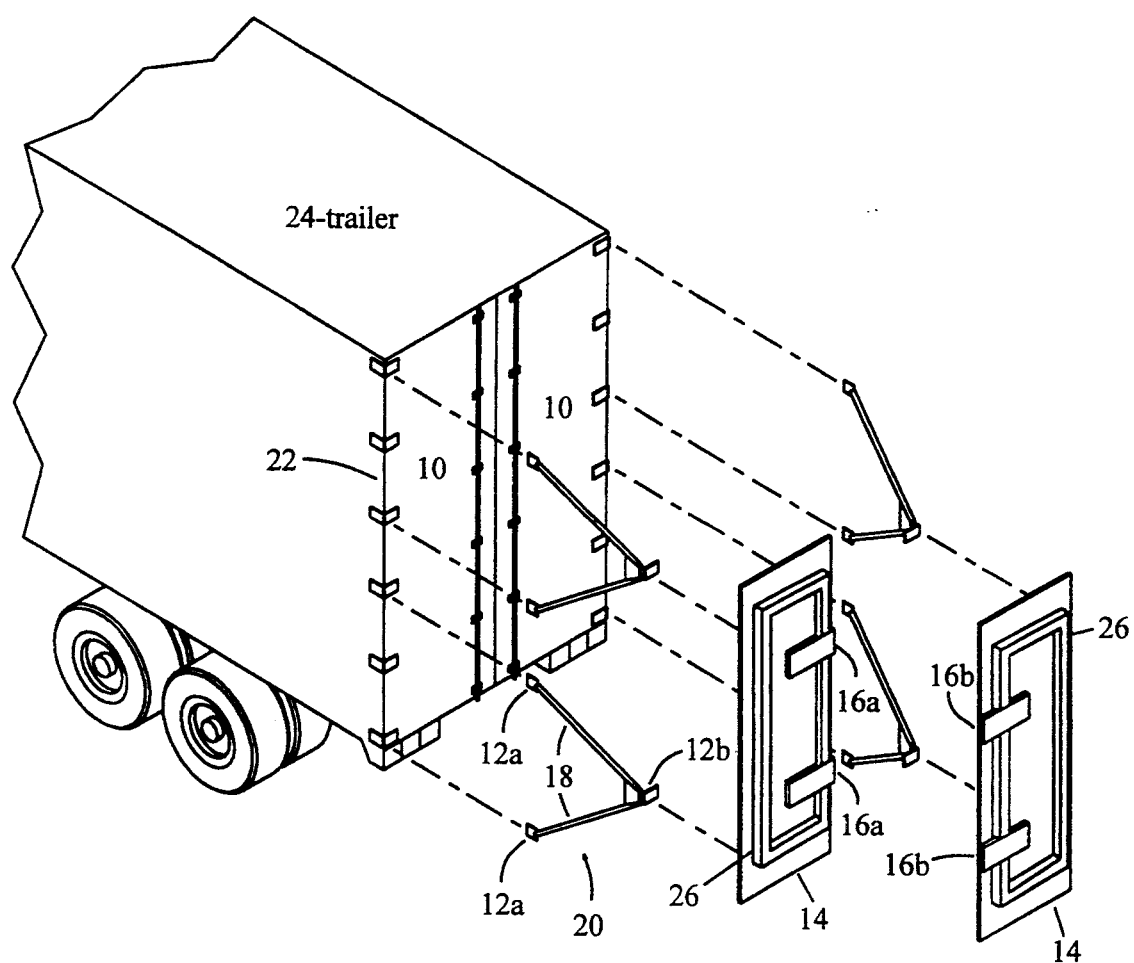
FIG. 5 is an exploded view showing the parts and their application to the rear end of a truck shown in FIG. 1.

FIG. 1 illustrates the rear end of a typical eighteen wheel truck trailer and FIG. 2 shows schematically the airflow pattern which is created as the truck moves forward at a normal speed of 55 miles per hour. It is this air flow pattern which creates the drag, the effect of which is to slow the truck's speed unless greater engine power is applied by the driver at a cost of fuel efficiency. The preferred embodiment of the present invention overcomes much of such drag by providing on the trailer 24 a set of rectangular plates 14 and truss assemblies 20 (FIG. 5).

Doors 10 of trailer 24 are typically framed by a structural member 22 to which a set of the V-shaped trusses 20 are mounted. Truss assembly 20 consists of two struts 18 which are terminated at the forward end by hinged flanges 12a which are bolted to structural member 22. At the aft end they are joined by a weld and terminated by another hinged flange 12b which is bolted to plate 14. Hinges 12b are aligned such that the struts can pivot freely about the vertical axis. While the geometry of truss assembly 20 is shown as V-shaped, other possibilities include A-shaped, trapezoidal or rectangular trusses. The sole requirement is that they provide sufficient strength and rigidity to support plate 14. They could be made of a metal such as steel, but can also be made of any material, metallic or nonmetallic, that is rigid and otherwise strong enough to prevent large deformations during on-road operation, retraction and extension.

In the preferred embodiment rectangular plates 14 are made of thin metal sheets, such as steel, reinforced about their perimeters with steel beams 26. The reinforcements must be of such strength that plates 14 do not deform under their own weight nor due to aerodynamic forces. Plates 14 and their reinforcements could also be made of aluminum, fiberglass, or other composite materials.

The mechanism described above allows truss assemblies 20 to pivot about a vertical axis at the vehicle's rear corner, and plates 14 to pivot about a vertical axis at the aft ends of trusses 20.

Two plates 14 are joined in their deployed position, shown in FIG. 3, by the two halves of latching mechanism 16a and b. These mechanisms hold the two symmetric halves of the invention rigidly together when deployed. They could be of several types, the only requirement being that they provide flexural as well as shearing and normal attachment rigidity between plates 14.

Plates 14 are typically positioned a distance behind trailer doors 10 approximately equal to 45% the width of trailer 24 and are centered with respect to doors 10. The total area of two plates 14 is smaller than the rear of trailer 24. The size difference typically but not necessarily forms an equal border 10% the width of trailer 24. This location, size, and shape must be optimized through experimentation on the trailer to which the invention will be applied. It is conceivable that modifications to the shape of plate 14, such as rounded corners or jagged edges, could increase their effectiveness.

OPERATION

Figure 6A:
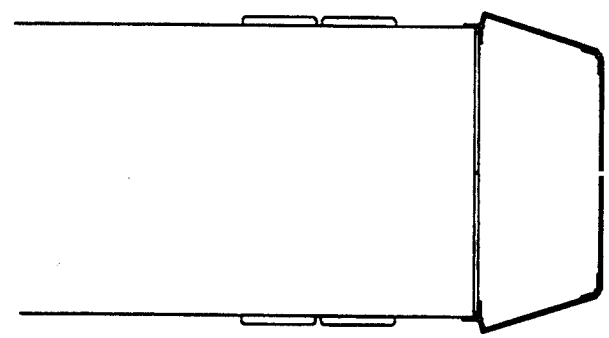
FIGS. 6a to 6e are top views of a truck-trailer showing how a typical embodiment of the invention swings into a stowed position and allows easy access to the rear doors.
Figure 6B:
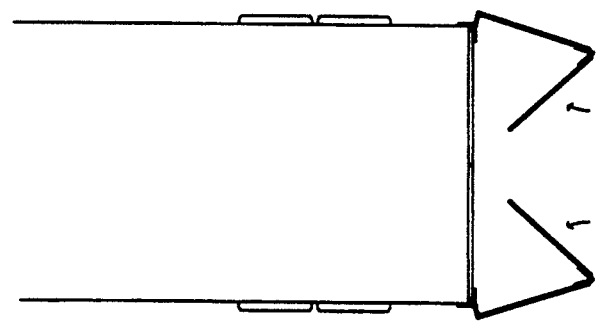
Figure 6C:
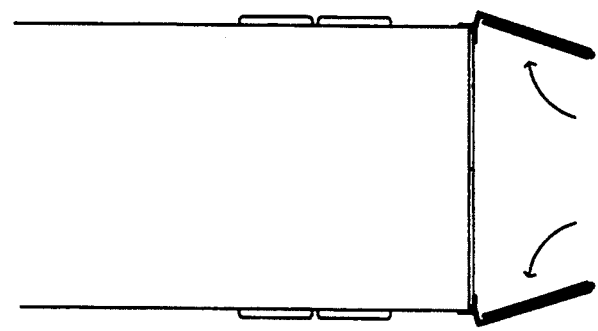
Figure 6D:
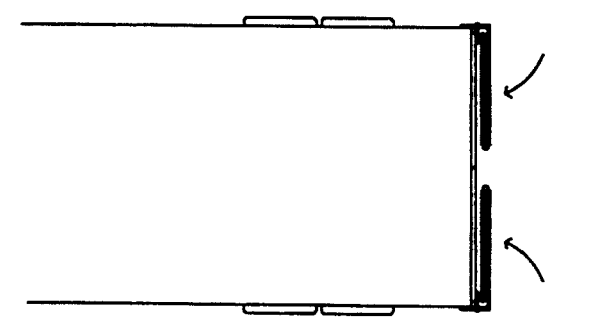
Figure 6E:
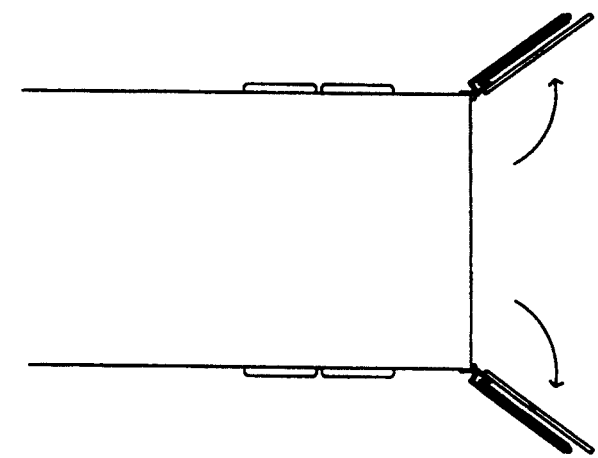

The retraction and extension of the preferred embodiment of the invention is shown in FIGS. 6a to 6e. Since extension of the invention is simply the reverse of retraction only the latter will be explained. Top views of the invention are shown attached to the rear end of a vehicle depicted as trailer 24. Plates 14 are parallel to the rear of trailer 24, and latching mechanisms 16a and b are engaged. In order to retract the invention mechanisms 16a and b must first be disengaged. Hinged flanges 12b then allow plates 14 to rotate inward as shown in FIG. 6b until plates 14 rest against truss assemblies 20 shown in FIG. 6c. The entire assembly consisting of trusses 20 and plates 14, can then be rotated about forward hinges 12a to lie against the rear of trailer 24, as shown in FIG. 6d. If the truck is as trailer 24 with outward opening doors 10, the doors and invention can be opened normally as in FIG. 6e. Other types of doors exist such as those which roll up instead of opening outward. In either case the invention can rotate freely outward about forward hinges 12a. This allows the entire invention to be moved from the loading path of the truck providing unobstructed access.

THEORY OF OPERATION

When the tractor-trailer is on the road and plates 14 are in their deployed position they make use of the locked vortex afterbody phenomenon. A circulating mass of air or vortex is trapped between plates 14 and doors 10, and creates a low pressure region. Air traveling over the top and sides of trailer 24 is then pulled downward or inward respectively as it passes the trailing edge. The modified flow pattern is such that the pressure at the rear end of the truck is higher than it would be without plates 14. Raising the base pressure decreases the base drag on the truck. This phenomenon was first validated by Mair (1965). Additionally he discovered a region in which circular plates behind a cylindrical body would produce an increase in drag. He found that it was caused by an instability in the locked vortices. Wind tunnel experiments of the current invention did not exhibit this drag increase. It is believed by the inventors that the sharp corners of trailer 24 and plates 14 stabilize the formation of these vortices. Using the preferred embodiment described above, a 15% reduction in drag was realized. It is believed that this will translate into a 10% reduction in fuel costs for truck operators.

CONCLUSION, RAMIFICATIONS, AND SCOPE OF INVENTION

Thus the reader will see that the rectangular plates of the invention are more practical and economical than adding any type of fairing or boat-tail to the end of trucks. The invention provides easy access to the rear doors, yet still reduces aerodynamic drag at a level of economical significance.

While our above description contains many specifics, these should not be construed as limitations on the scope of the invention, but rather as an exemplification of one preferred embodiment thereof. Many other variations are possible such as different methods of mounting the invention to a vehicle. The plates of the invention may be stowed on the roof of the vehicle or be mounted directly to the rear doors of a trailer. In addition the vehicle described above could be an automobile, train, or other land vehicle. Accordingly, the scope of the invention should be determined not by the embodiment illustrated, but by the appended claims and their legal equivalents.

We claim:

1. Means to reduce the drag on a land operating vehicle when said vehicle is moving on a land surface at a predetermined speed, said vehicle comprising a body having a forward end and an after end disposed about an axis parallel to the land surface over which said vehicle is moved, said after-end of the body having a polygonal cross-section and lying in a first plane normal to said axis, the area of the after-end being of a first predetermined square footage, said means comprising:

A. a rigid polygonal plate, said plate having an area of a second predetermined square footage, said second predetermined square footage being less than the first said square footage, and said plate having a configuration similar to the polygonal configuration of the after end of the body; and B. strut support means secured to the after-end of the body to secure said plate in a predetermined spaced relationship congruently parallel to said after-end of the body.

2. The means to reduce drag as described in claim 1 wherein said plate is formed of at least two polygonal sections secured together by locking means, said locking means being adapted for unlocking to permit the plate sections to be moved independently of each other; and said strut support means is hingedly secured to the after-end of the body to permit the movement of at least one of said plate sections away from its said congruently parallel disposition with respect to the after-end of the body.

3. The means as described in claim 2 wherein the after-end of the body is provided with a pair of similar doors, each door being hingedly secured to one side edge of the after-end of the body for opening and closing said after-end, said closing bringing the doors together on a vertical central line normal to the body axis; and the support means to secure the sections constituting the plate comprises struts hingedly secured to the sides of the after-end of the body and to each plate sections to enable each sections of the plate, when the locking means are unlocked, to be swung inwardly toward each other and folded in abutment with one of the doors, thereby permitting such door to be opened with the plate sections disposed in parallel abutment with the door.

4. The means to reduce the drag from a land operating vehicle as described in claim 2, wherein the plate sections are formed of thin metal sheets reinforced about their perimeters with metal beams.

5. The means to reduce the drag on a land operating vehicle described in claim 1 wherein the plate is positioned at a predetermined distance behind the after-end of the body which predetermined distance is equal to approximately 45% of the width of the body.

6. The means to reduce the drag on a land operating vehicle as described in claim 1 wherein the first predetermined square footage exceeds the second predetermined square footage such that when the plate is congruently disposed in relation to the after-end of the body the perimeter difference is approximately 10% of the width of the body.

* * * * *